No. 662,464. Patented Nov. 27, 1900.
P. H. PEACOCK.
APPARATUS FOR CUTTING BUTTER.
(Application filed June 25, 1900.)

(No Model.) 2 Sheets—Sheet 1.

Witnesses:
O. H. Keeney.
Anna V. Faust.

Inventor:
Pliny H. Peacock
By Benedict & Morsell
Attorneys.

No. 662,464. Patented Nov. 27, 1900.
P. H. PEACOCK.
APPARATUS FOR CUTTING BUTTER.
(Application filed June 25, 1900.)
(No Model.) 2 Sheets—Sheet 2.
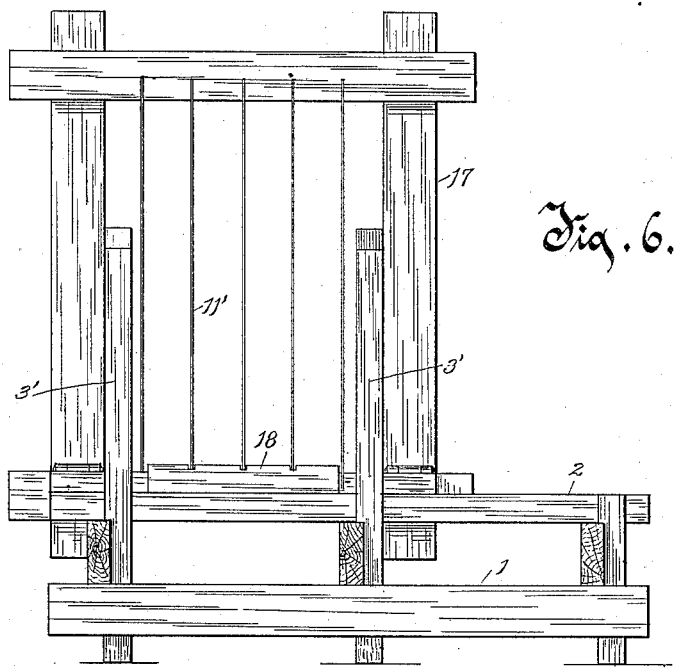
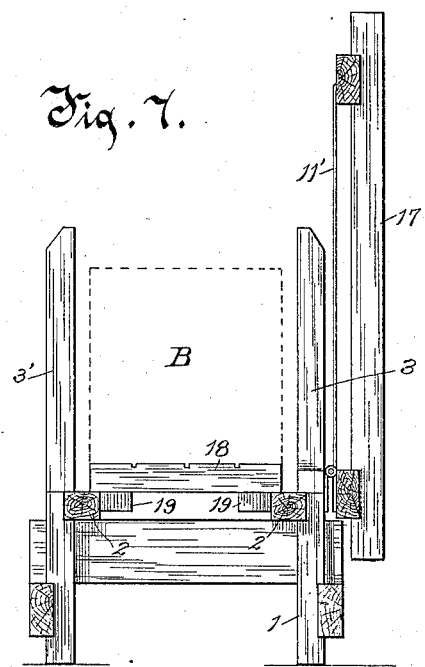
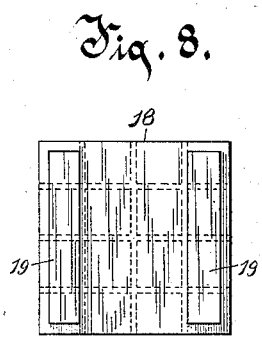
Witnesses:
Inventor:
Pliny H. Peacock
By Benedict Morsell
Attorneys.

UNITED STATES PATENT OFFICE.

PLINY H. PEACOCK, OF SHEBOYGAN, WISCONSIN.

APPARATUS FOR CUTTING BUTTER.

SPECIFICATION forming part of Letters Patent No. 662,464, dated November 27, 1900.

Application filed June 25, 1900. Serial No. 21,491. (No model.)

*To all whom it may concern:*

Be it known that I, PLINY H. PEACOCK, residing at Sheboygan, in the county of Sheboygan and State of Wisconsin, have invented a new and useful Improvement in Apparatus for Cutting Butter, of which the following is a description, reference being had to the accompanying drawings, which are a part of this specification.

My invention relates to an improved apparatus for cutting butter or analogous material into blocks, and is especially adapted for use by dealers in butter for cutting into blocks or bricks a mass of butter as taken from tubs or boxes, especially the square boxes known as "Australian" packages.

The invention consists of the apparatus, its parts, and combinations of parts, as herein described and claimed, or the equivalents thereof.

Figure 1:
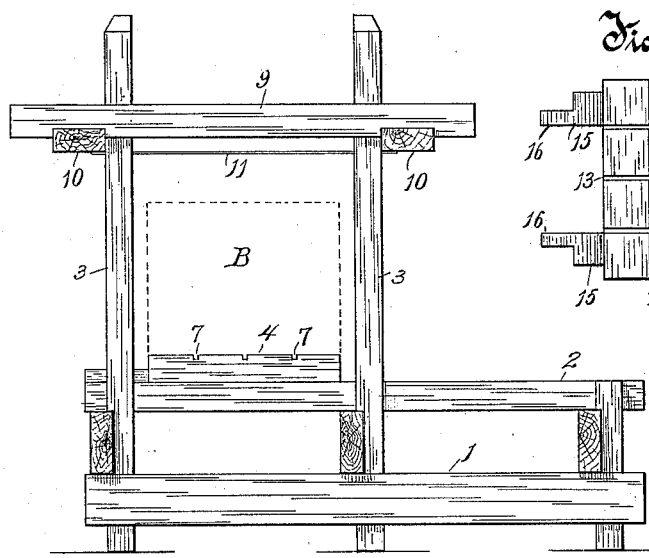
Figure 4:
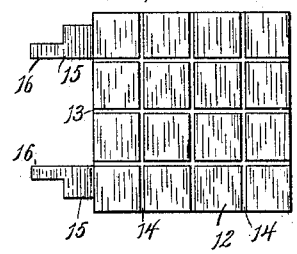
Figure 2:
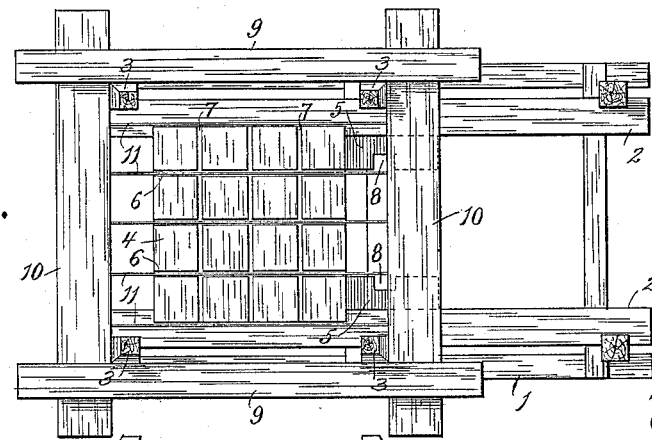
Figure 3:
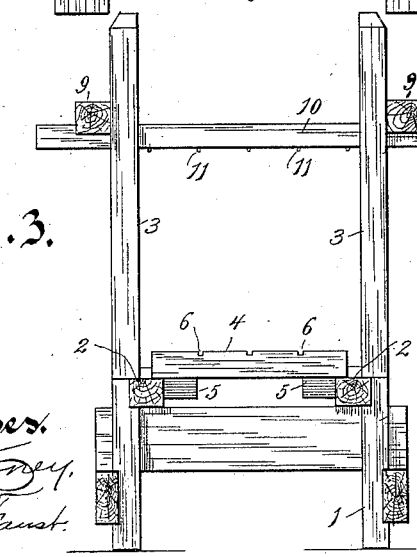
Figure 5:
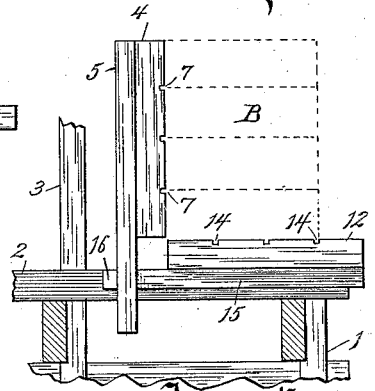

In the drawings, Figure 1 is a side elevation of the apparatus in position for making a first cut through a mass of butter, the butter being indicated by dotted lines as being a square mass resting on the cutting-board. Fig. 2 is a top plan view of the same apparatus shown in Fig. 1. Fig. 3 is an end view of the same apparatus. Fig. 4 is a plan view of an auxiliary cutting-board employed with the apparatus shown in Fig. 1. Fig. 5 is a detail of the construction, showing the cutting-board and the auxiliary cutting-board with a mass of butter in connection therewith, indicated in dotted lines, after the cuts in one direction have been made through the butter. Fig. 6 is an elevation of a modified form of apparatus. Fig. 7 is an end view of the modified form of apparatus shown in Fig. 6. Fig. 8 is a modified form of cutting-board especially adapted for use with the modified form of apparatus shown in Figs. 6 and 7.

In the drawings, 1 is a frame of such size and form as adapts it for the needs of the apparatus as herein described. As a part of the frame two parallel rails 2 2 are at a suitable distance apart to adapt them for supporting the cutting-board movably thereon. Four posts 3 3, secured to and forming a part of the frame, project upwardly therefrom. These posts are at the corners of a rectangular parallelogram, preferably a square. A cutting-board 4 of such size and form as adapts it to rest on the rails 2 2 is provided with means, conveniently cleats 5, secured thereto on its under surface, to retain the cutting-board against lateral movement on the rails 2 2. The construction permits of the movement of the cutting-board 4 along on the rails 2 2 endwise and also permits of the removal of the cutting-board from the rails by lifting it therefrom. The cutting-board is provided with a plurality of parallel grooves 6 6 in its upper surface, which grooves are advisably at equal distances from each other and may be of a similar distance from the parallel edges of the board. The cutting-board is also provided with parallel grooves 7 7 in the upper surface of the cutting-board, extending across it in another direction and preferably at right angles to the groove 6 6 and at equal distances from each other. The cleats 5 on this cutting-board are (for the purposes of the form of apparatus shown in Figs. 1 to 5, inclusive) extended beyond the cutting-board at one edge and are provided with recesses or mortises 8 8 for purposes hereinafter described.

A cutter-frame consisting of the parallel bars 9 9, running in one direction, and the parallel bars 10 10, running in the other direction, is of such size and of such form, with respect to being square or otherwise in parallelogram form, as adapts it to fit loosely about the posts 3 3 and to be movable vertically on and about those posts as guides. The frame is provided with transverse wires 11 11, to serve as butter-cutters, that are parallel to each other and at the same distances apart as the grooves 6 6 in the cutting-board. These wires are also so arranged in the cutter-frame as, when the frame is in place about the posts 3 3, to register with the grooves 6 6, or if turned so that the cutters extend in the other direction, then so as to register with the grooves 7 7 in the cutting-board. The auxiliary cutting-board 12 (shown separately in Fig. 4) is also provided with parallel grooves 13 13 in its surface at equal distances apart running in one direction and transverse grooves 14 14 at equal distances apart running in another direction. These sets of grooves running in directions at right angles to each other are advisably at the same distances apart and must be so when a single cutting-frame is employed. This auxiliary cutting-board is provided with cleats 15 15, adapted to fit between the rails 2 2 and permit of the movement of the board along on the rails 2 2 and of the removal of the board therefrom. These cleats are also provided with terminal tongues or tenons 16 16, adapted to be inserted in the recesses or mortises 8 8, for use as hereinafter described.

When used the cutting-board 4 is placed on the rails 2 2 within the space inclosed by the vertical planes of the posts 3 3 and the mass of butter to be cut up (indicated at B by dotted lines) is placed on the cutting-board and the cutter-frame is placed on and about the posts 3 3, as shown in Figs. 1, 2, and 3, and the cutter-frame is then forced down to the cutting-board, carrying the cutters 11 through the mass of butter into the grooves 6 6 in the cutting-board. Thereupon the cutter-frame is raised above the posts 3 3 and turned horizontally to a position at right angles to its former position, and the frame is then again forced down, taking the cutters through the butter in a direction at right angles to their former passage through the butter, thus cutting the butter up into elongated bricks. The cutter-frame is again lifted from the posts 3 3, and the auxiliary cutter-board 12 is then placed at the side of the mass of butter on the cutting-board 4, the tenons 16 being inserted in the mortises 8. This holds the auxiliary board 12 in upright position at the side of the mass of butter on the board 4. Thereupon the two cutting-boards, with the mass of butter thereon, are tipped over, the auxiliary board 12 being brought down onto the rails 2 2, as shown in Fig. 5. The cutting-board 4 is then removed from the board 12, and the board 12, with the load of partially-cut-up butter thereon, is pushed along on the rails 2 2 to position within the square of the posts formerly occupied by the cutting-board 4, as shown in Figs. 1 and 2. Thereupon the cutter-frame is again placed on and about the posts 3 and the cutters are forced down through the butter, cutting it in the other direction into bricks, which in the forms shown in Figs. 1 to 5, inclusive, are square blocks.

In the modified form of apparatus shown in Figs. 6 and 7 the posts 3' 3' are preferably a little less tall than in the form shown in Fig. 1, and the cutter-frame 17 is hinged to the frame at one side thereof, being so disposed that it can be swung down over the posts, the wire cutters 11' being so disposed as to come down between the posts and into the grooves in the surface of the cutting-board 18. The cutter-frame 17 in this form of apparatus is advisably elongated somewhat in the direction it has when turned down onto the cutting-board, the object being to secure such length of the cutter-frame as to provide clearance for the posts 3' 3' when the cutter-frame is swung down and up. With this form of apparatus a cutting-board 18 of modified form is employed. This cutting-board has grooves in its surface extending in both directions transversely across the board, the grooves across the board in one direction being at right angles to those across the board in the other direction. Also the cleats 19 19 are preferably made of a length that exactly equals the distance between the outer longitudinal edges of the cleats, so that this cutting-board, with its cleats, is adapted to be placed on the rails 2 2 with grooves running across the frame in registration with the cutter-wires 11' and to be lifted from the rails and turned one-quarter around and again placed on the rails with the other grooves in registration with the cutter-wires. With this form of apparatus a second or duplicate cutting-board, substantially like the cutting-board 18, can be employed to turn the butter over onto for supporting it to be cut after it has been cut in the two directions provided for on the cutting-board 18. This is to be done substantially in the manner hereinbefore described with reference to the cutting-boards 4 and 12 and will be readily understood.

What I claim as my invention is—

1. In combination, a frame having long horizontally-disposed parallel rails, posts therewith at corners of a parallelogram, the parallelogram being coincident with a portion of the space between said rails at one end thereof and not exceeding one-half of the length of the rails, a cutter-board having parallel grooves in its upper surface, the board being formed to rest within said parallelogram slidably and removably on the rails, and a cutter-frame provided with transverse cutters disposed to register with the grooves in the cutter-board when the board is within said parallelogram and the frame is placed on and about the posts.

2. In combination, a frame having long horizontally-disposed parallel rails, posts therewith at corners of a square the square being coincident at one end with substantially one-half of the space between said rails, a cutter-board having parallel and transverse parallel grooves in its upper surface, the board being adapted to rest on the rails within the square of the posts, and a cutter-frame in square form fitting movably vertically on and about the posts in an initial position and in a position acquired by being lifted off the posts and turned a quarter around from such initial position, the cutter-frame being provided with transverse parallel cutters disposed to register with the grooves in the cutter-board.

3. In combination, a frame having elongated parallel rails, a primary cutter-board adapted to rest removably on the rails and having means to prevent the board from movement laterally on the rails, an auxiliary cutter-board also capable of resting on said rails, and means adapted to secure the auxiliary cutter-board detachably to the primary cutter-board in a plane at a right angle to the primary cutter-board.

In testimony whereof I affix my signature in presence of two witnesses.

PLINY H. PEACOCK.

Witnesses:
 GEO. H. DETLING,
 VAL DETLING.